US011073967B2

(12) United States Patent
Quail

(10) Patent No.: US 11,073,967 B2
(45) Date of Patent: Jul. 27, 2021

(54) METHODS AND SYSTEMS FOR PROVIDING ADDITIONAL CONTENT

(71) Applicant: DISH Technologies L.L.C., Englewood, CO (US)

(72) Inventor: Gavin Quail, West Yorkshire (GB)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 16/459,323

(22) Filed: Jul. 1, 2019

(65) Prior Publication Data

US 2019/0324617 A1 Oct. 24, 2019

Related U.S. Application Data

(63) Continuation of application No. 15/862,340, filed on Jan. 4, 2018, now Pat. No. 10,402,063, which is a continuation of application No. 14/446,120, filed on Jul. 29, 2014, now Pat. No. 9,904,441.

(51) Int. Cl.
| | |
|---|---|
| *G06F 17/00* | (2019.01) |
| *G06F 3/0484* | (2013.01) |
| *H04L 29/06* | (2006.01) |
| *H04N 21/2387* | (2011.01) |
| *H04N 21/431* | (2011.01) |
| *H04N 21/6587* | (2011.01) |

(52) U.S. Cl.
CPC ............ *G06F 3/0484* (2013.01); *H04L 65/60* (2013.01); *H04N 21/2387* (2013.01); *H04N 21/4316* (2013.01); *H04N 21/6587* (2013.01)

(58) Field of Classification Search
CPC ....... G06F 16/40; G06F 3/0484; H04N 5/147; H04N 21/2387; H04N 21/4316
USPC ......... 715/204, 202, 723, 201; 386/345, 350
See application file for complete search history.

(56) References Cited

U.S. PATENT DOCUMENTS

| | | | |
|---|---|---|---|
| 6,058,240 A | 5/2000 | McLaren et al. | |
| 6,445,738 B1 | 9/2002 | Zdepski et al. | |
| 8,661,464 B2 * | 2/2014 | Arankalle | H04N 21/812 725/32 |
| 8,774,609 B2 * | 7/2014 | Drake | H04N 21/44016 386/350 |
| 8,990,104 B1 | 3/2015 | Zhu | |

(Continued)

FOREIGN PATENT DOCUMENTS

WO 2016016636 2/2016

OTHER PUBLICATIONS

U.S. Appl. No. 14/446,120, "Final Office Action", dated Jun. 2, 2017, 12 pages.

(Continued)

*Primary Examiner* — Stephen S Hong
*Assistant Examiner* — Matthew J Ludwig
(74) *Attorney, Agent, or Firm* — Kilpatrick Townsend & Stockton LLP

(57) ABSTRACT

Systems and methods for incorporating additional material in video content are described. Exemplary methods may include identifying the individual frames within a portion of video content that will be visible during adjusted playback. The methods may include incorporating at least one item of information within at least one of the individual frames identified to produce modified video content. The methods may also include transmitting the modified video content for display.

20 Claims, 6 Drawing Sheets

(56) References Cited

U.S. PATENT DOCUMENTS

| | | | |
|---|---|---|---|
| 9,066,131 B1* | 6/2015 | Arsenault | H04N 21/432 |
| 9,357,240 B2 | 5/2016 | Pradeep et al. | |
| 9,363,567 B2 | 6/2016 | Hasek | |
| 9,456,237 B2* | 9/2016 | Oztaskent | H04N 21/4307 |
| 9,560,984 B2 | 2/2017 | Pradeep et al. | |
| 9,591,365 B2* | 3/2017 | Stathacopoulos | H04N 21/42222 |
| 9,602,885 B2* | 3/2017 | Weast | H04N 21/23418 |
| 9,710,307 B1 | 7/2017 | Corley et al. | |
| 9,769,540 B2* | 9/2017 | Kummer | H04N 21/454 |
| 9,813,760 B2* | 11/2017 | Wen | H04N 21/25808 |
| 9,904,441 B2 | 2/2018 | Quail | |
| 9,930,404 B2* | 3/2018 | Friedrich | H04N 21/47217 |
| 9,967,635 B2* | 5/2018 | Gavade | H04N 21/4882 |
| 10,110,949 B2* | 10/2018 | Nagorniak | H04N 21/44016 |
| 10,306,332 B2* | 5/2019 | Hardy | H04N 21/2543 |
| 10,764,652 B2* | 9/2020 | Acharya | H04N 21/6587 |
| 2002/0090198 A1 | 7/2002 | Rosenberg | H04N 21/4312 386/228 |
| 2002/0144262 A1* | 10/2002 | Plotnick | H04N 21/252 725/32 |
| 2003/0152363 A1 | 8/2003 | Jeannin et al. | |
| 2004/0268384 A1* | 12/2004 | Stone | H04N 21/4508 725/32 |
| 2006/0168630 A1 | 7/2006 | Davies et al. | |
| 2008/0152300 A1* | 6/2008 | Knee | H04N 21/812 386/250 |
| 2008/0155585 A1* | 6/2008 | Craner | G11B 27/036 725/32 |
| 2010/0077435 A1 | 3/2010 | Kandekar et al. | |
| 2011/0264700 A1 | 10/2011 | Mei et al. | |
| 2012/0233540 A1* | 9/2012 | Collet | G06F 40/14 715/234 |
| 2012/0291073 A1* | 11/2012 | Friedman | H04N 5/44582 725/62 |
| 2014/0020017 A1* | 1/2014 | Stern | H04N 21/2747 725/34 |
| 2016/0034119 A1 | 2/2016 | Quail | |
| 2018/0129387 A1 | 5/2018 | Quail | |

OTHER PUBLICATIONS

U.S. Appl. No. 14/446,120, "Non-Final Office Action", dated Dec. 5, 2016, 8 pages.

U.S. Appl. No. 14/446,120, "Notice of Allowance", dated Oct. 6, 2017, 5 pages.

U.S. Appl. No. 15/862,340, "Non-Final Office Action", dated Sep. 21, 2018, 8 pages.

U.S. Appl. No. 15/862,340, "Notice of Allowance", dated Apr. 4, 2019, 6 pages.

PCT/GB2015/052179, "International Preliminary Report on Patentability", dated Feb. 9, 2017, 7 pages.

PCT/GB2015/052179, "International Search Report and written opinion", dated Sep. 28, 2015, 9 pages.

* cited by examiner

METHODS AND SYSTEMS FOR PROVIDING ADDITIONAL CONTENT

CROSS-REFERENCES TO RELATED APPLICATIONS

The present application is a continuation of U.S. patent application Ser. No. 15/862,340, filed Jan. 4, 2018, entitled "METHODS AND SYSTEMS FOR PROVIDING ADDITIONAL CONTENT," which application is a continuation of U.S. patent application Ser. No. 14/446,120, filed Jul. 29, 2014, entitled "METHODS AND SYSTEMS FOR PROVIDING ADDITIONAL CONTENT," now U.S. Pat. No. 9,904,441, issued Feb. 27, 2018, the contents of which are incorporated herein by reference, in their entirety.

TECHNICAL FIELD

The present technology relates to systems and methods for providing additional content during audiovisual content. More specifically, the present technology relates to incorporating and providing subtextual content that becomes prevalent during adjusted playback operations.

BACKGROUND

As technology, such as audiovisual technology, continues to improve, a variety of modifications can be performed based on user preferences. For example, if a viewer is watching commercial television, the viewer may have pause and fast-forward capabilities throughout the broadcast allowing them to skip over certain content such as advertisements. However, as advertisements often contribute to production budgets, advertisers may disapprove of this conduct, but accept it as a reality. Depending on the speed of fast-forward or rewind operations, a viewer may not even recognize what business or product is being advertised during a commercial break.

Thus, there is a need for improved methods and systems for identifying material during adjusted playback. These and other needs are addressed by the present technology.

SUMMARY

Systems and methods for incorporating additional material in video content are described. Exemplary methods may include identifying the individual frames within a portion of video content that will be visible during adjusted playback. The methods may include incorporating at least one item of information within at least one of the individual frames identified to produce modified video content. The methods may also include transmitting the modified video content for display.

In disclosed embodiments the adjusted playback may include a fast-forwarding or rewind operation, and a fast-forwarding adjusted playback may include selecting at least one individual frame to be displayed for a period of time while traversing a portion of the modified video content. The fast-forwarding operation may include displaying a subset of the individual frames corresponding to the speed of the fast-forwarding operation. The fast-forwarding operation may include at least about 2, 3, 4, 5, 6, 8, 16, etc., or more times speed of normal playback. The at least one item of information may be at least substantially hidden during normal playback of the modified video content in embodiments. The at least one item of information may include an icon or text, and may include moving content in disclosed embodiments.

In embodiments the at least one item of information within the at least one of the individual frames identified may include incorporating the at least one item of information in a first position on a first identified frame, and incorporating the at least one item of information in a second position on a second identified frame. The second position may be the same or different from the first position, and the second identified frame may include a frame of the identified individual frames that will be visible during adjusted playback, and may be sequential to the first identified frame that will be visible during adjusted playback. The methods may further include determining the context of the video content to which the at least one item of information is being incorporated. The at least one item of information may be incorporated based on the context of the video content, and positioned on the individual frame in a location configured to reduce distraction to a viewer or user.

The present technology may also include an electronic device including at least one input component configured to receive audiovisual content, and at least one output component communicatively coupled with at least one display device. The electronic device may include one or more processors, as well as memory communicatively coupled with and readable by the one or more processors and having stored therein processor-readable instructions, which when executed by the one or more processors cause the one or more processors to receive video content including modified video content comprising a subset of individual frames having incorporated additional content. The processors may also be caused to receive an instruction to adjust playback, and to transmit via at least one output the subset of individual frames having the incorporated additional content.

The instruction to adjust playback may include an instruction to fast-forward, and the transmission may include providing at least one of the subset of individual frames to be displayed for a period of time while traversing a portion of the modified video content. The transmission may include providing for display a selection of the subset of the individual frames corresponding to the speed of the fast-forwarding operation in disclosed embodiments, and the fast-forwarding operation may be at least 4 times speed of normal playback in disclosed embodiments. The at least one item of information may be substantially hidden during normal playback of the modified content in disclosed embodiments, and the transmitted subset of individual frames may display an icon that moves position within the frame space from one of the individual frames displayed to the next.

Such technology may provide numerous benefits over conventional techniques. For example, an advertiser may be able to provide a level of advertisement material to a user who may be attempting to skip over the normal advertising content. Additionally, the incorporated content may be included in a way to minimize distraction to viewers who may be watching the content at normal playback speeds. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to incorporating additional material in video content, including hidden content. The technology can allow content generators including advertisers to provide content in a way that a viewer may still be shown a quality advertising message even during adjusted playback operations including fast-forward or rewind. In so doing, advertisers or sponsors may still be able to provide improved advertising content that can be viewed both by users watching in normal operation as well as users watching in adjusted operation such as fast-forward. These and other benefits will be explained in detail below.

Although embodiments detailed herein are directed toward modifying television based content, the principles easily can be extended to other types of content and devices, such as DVD equipment, digital video recorder (DVR) equipment, video game equipment, computer equipment, handheld electronic devices, and the like. In addition, the terms "television" or "television service" can include traditional television programming, such as linear television programs, as well as other types of audio, video and/or audiovideo content, such as on-demand video content, on-demand or streaming audio content, streaming video content and the like delivered via any type of content delivery systems, such as cable, satellite, cellular/wireless, terrestrial broadcast, Internet/IP, and/or any other content delivery technology or system currently known or hereafter developed. Furthermore, embodiments herein describe set-top boxes or receivers and/or other devices being connected with a television or other device having an electronic display. However, the electronic device can also be incorporated into or be a part of the device having the display or display device, such as a television with an integrated cable, satellite, terrestrial, or IPTV receiver. Alternatively, the electronic device may be a DVR or DVD player including the present technology. The technology discussed herein additionally can be extended to any of a variety of other electronic devices, display devices, or combined devices, such as, for example, computers, tablets, hand-held mobile devices, cell phones, e-readers, personal media players, and the like. A person of ordinary skill in the art will recognize various alterations, additions, omissions, and substitutions.

Figure 1:
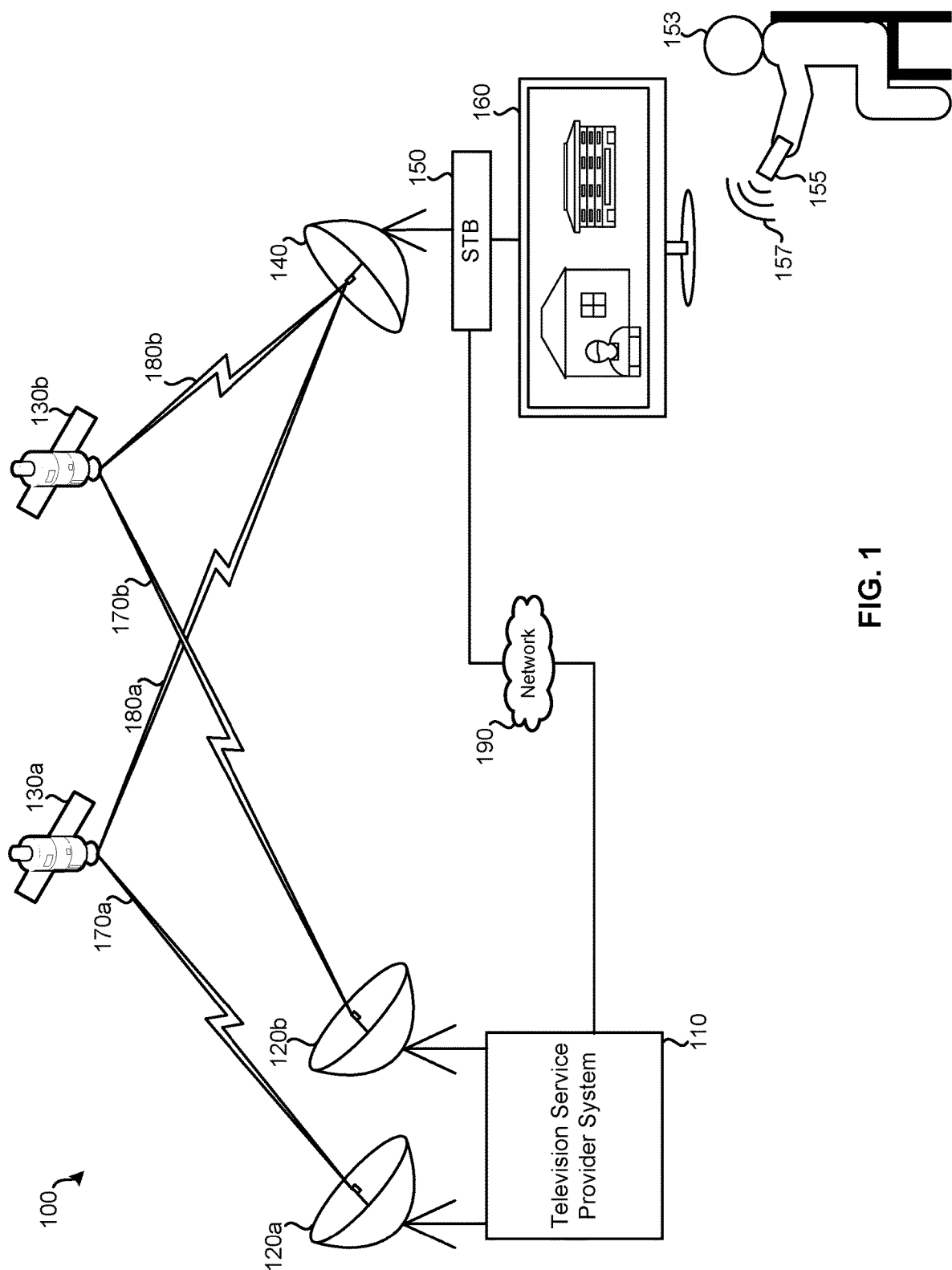
FIG. 1 shows a simplified media service system that may be used in accordance with embodiments of the present technology.

FIG. 1 is a simplified illustration of an embodiment of a satellite television distribution system 100. Satellite television distribution system 100 may include: television service provider system 110, satellite transmitter equipment 120, satellites 130, satellite dish 140, set-top box (STB) 150, and television 160. The television 160 can be controlled by a user 153 using a remote control device 155 that can send wireless signals 157 to communicate with the STB 150 and/or television 160. Although discussed as being wireless for user convenience, the technology may additionally include a wired coupling between the remote control device 155 and STB 150 or television 160. Alternate embodiments of the satellite television distribution system 100 may include fewer or greater numbers of components. While only one satellite dish 140, STB 150 and television 160, collectively referred to as user equipment, are illustrated, it should be understood that multiple (tens, thousands, millions, etc.) instances of user equipment may be connected within the data communication network 190.

Television service provider system 110 and satellite transmitter equipment 120 may be operated by a television service provider. A television service provider may distribute television channels, on-demand programing, programming information, and/or other services to users. Television service provider system 110 may receive feeds of one or more television channels or audio channels from various sources. Such television channels may include multiple television channels that contain the same content, but may be in different formats, such as high-definition and standard-definition. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120, and/or other satellite transmitter equipment, to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130a. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
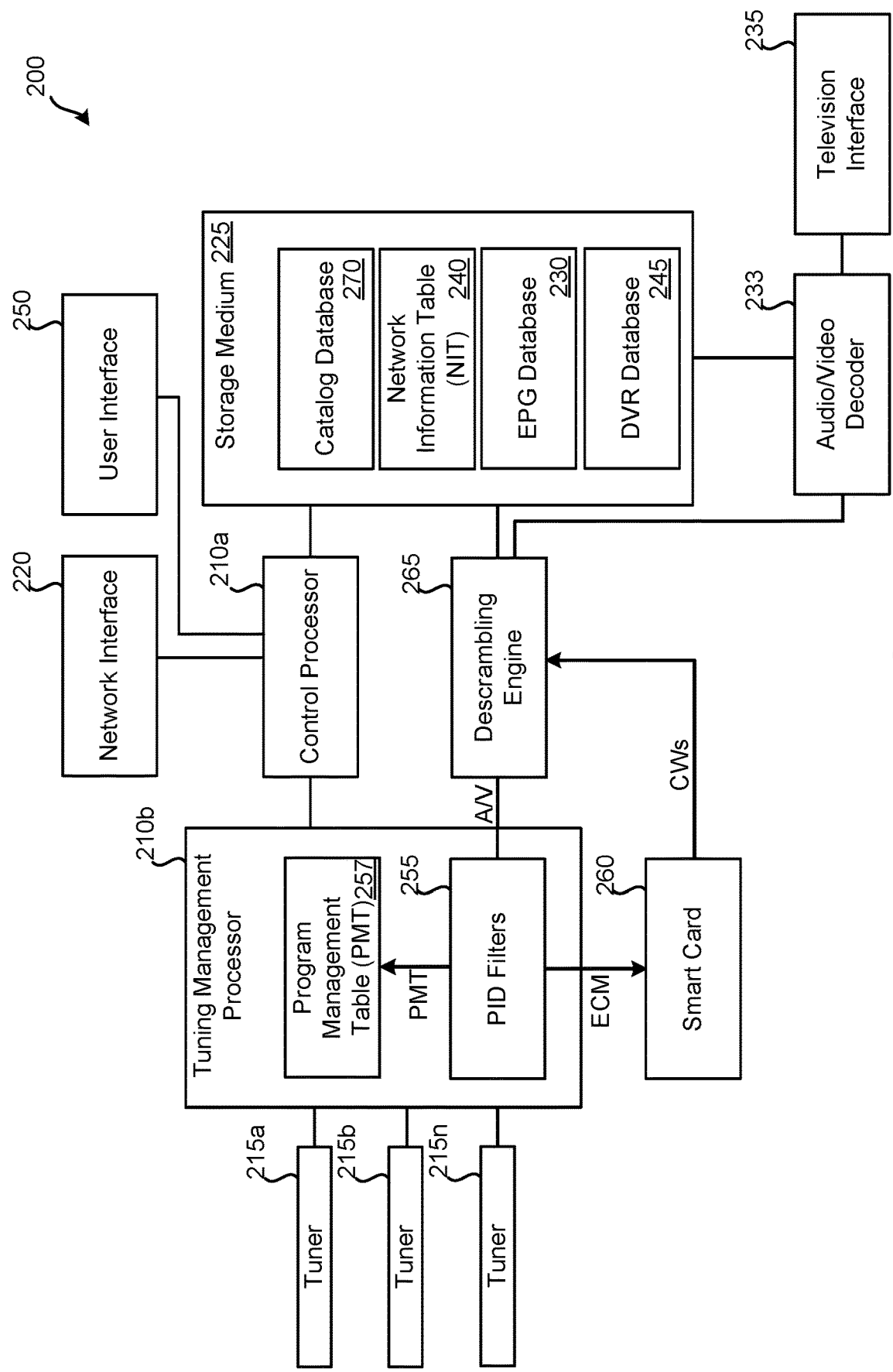
FIG. 2 illustrates an exemplary electronic device that may be used in accordance with embodiments of the present technology.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional details of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170a represents a signal between satellite uplink 120a and satellite 130a. Uplink signal 170b represents a signal between satellite uplink 120b and satellite 130b. Each of uplink signals 170 may contain streams of one or more different television channels. For example, uplink signal 170a may contain a certain group of television channels, while uplink signal 170b contains a different grouping of television channels. Each of these television channels may be scrambled such that unauthorized persons are prevented from accessing the television channels.

Transponder stream 180a represents a signal between satellite 130a and satellite dish 140. Transponder stream 180b represents a signal path between satellite 130b and satellite dish 140. Each of transponder streams 180 may contain one or more different television channels in the form of transponder streams, which may be at least partially scrambled. For example, transponder stream 180a may include a first transponder stream containing a first group of television channels, while transponder stream 180b may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region, e.g., to distribute local television channels to the relevant market. Different television channels may be transmitted using the same frequency of the transponder stream to a different geographic region.

FIG. 1 illustrates transponder stream 180a and transponder stream 180b being received by satellite dish 140. For a first group of television channels, satellite dish 140 may receive a transponder stream of transponder stream 180a; for a second group of channels, a transponder stream of transponder stream 180b may be received. STB 150 may decode the received transponder stream. As such, depending on which television channel(s) are desired, a transponder stream from a different satellite, or a different transponder of the same satellite, may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood, however, that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. It is also to be understood that the technology disclosed herein can be practiced on and by cable, satellite, internet-based, over-the-air, or any other system that distributes video for display.

FIG. 2 illustrates an embodiment of a television receiver 200, in accordance with certain embodiments of the present disclosure. The television receiver 200 may correspond to the television receiver or set-top box (STB) 150 of FIG. 1. In some embodiments, the receiver 200 may include more or less functionality as compared to the STB 150, and may depend at least to a certain degree on receiver to implement certain features or functionality.

Television receiver 200 may be in the form of a separate device configured to be connected with one or more display devices, such as televisions 160. Embodiments of television receiver 200 can include set top boxes (STBs). In addition to being in the form of an STB, a television receiver may be incorporated as part of another device, such as a television, other form of display device, video game console, computer, mobile phone, tablet, or the like. For example, a television may have an integrated television receiver, which does not involve an external STB being coupled with the television.

Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 270, remote control interface or user interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210b may control how many video streams are provided to individual display devices, which may be defined based on user preferences. Control processor 210a may also communicate with network interface 220 and remote control interface 250. Control processor 210a may handle incoming data from network interface 220 and remote control interface 250. Additionally, control processor 210a may be configured to output data via network interface 220.

Tuners 215 may include one or more tuners used to tune to transponders that include broadcasts of one or more television channels. In some embodiments, two, three, or more than three tuners may be present, such as four, six, or eight tuners or more. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. In disclosed embodiments, tuner 215 may include a full-band tuner configured to receive the whole broadcast band on a single tuner. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to tune to certain frequencies. In some embodiments, the key combination database and/or remote control lock rules are stored and processed by the remote control.

Network interface 220 may be used to communicate via an alternate communication channel with a television service provider, if such communication channel is available. The primary communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. In disclosed embodiments, television programs may be received directly over network interface 220, along with information regarding included advertisements as discussed more thoroughly below. Information may be transmitted and/or received via network interface 220. For instance, instructions from a television service provider may also be received via network interface 220, if connected with the Internet. Network interface 220 may also be used to communicate with mobile devices of users, via a local wireless network, the Internet, and/or a cellular network.

Storage medium 225 may represent one or more non-transitory computer-readable storage mediums. Storage medium 225 may include memory and/or a hard drive. Storage medium 225 may be used to store information received from one or more satellites, via a cable network, via some other form of television service provider network, and/or information received via network interface 220. Storage medium 225 may store information related to EPG database 230, DVR database 245, and/or on-demand programming 270. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. Information from EPG database 230 may be output as a video stream to a display device. A particular user may issue commands indicating that an EPG interface be presented. A user issuing a command that an EPG be displayed may constitute a change command.

The network information table (NIT) 240 may store information used by television receiver 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by television receiver 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to look up the audio PIDs and video PIDs in another table, such as a program management table (PMT). For example, a program management table (PMT) may store information on audio PIDs and video PIDs for television channels that are transmitted on a transponder frequency.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 270 and/or information from EPG database 230, to a television for presentation. Television interface 235 may also serve to output a CVM. Television interface 235 may be configured to be connected with multiple display devices. Therefore, different video feeds may be presented via different display devices. Television interface 235 may also be configured to output multiple, e.g., 3, 3, 4, 5, 6, etc., video streams to a single display device for simultaneous presentation.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite. Content from DVR database 245 may be output as a video stream to a display device. A particular user may issue commands indicating that recorded content be presented.

As an example of DVR functionality of television receiver 200 being used to record based on provider-defined timers, a television service provider may configure television receiver 200 to record television programming on multiple, predefined television channels for a predefined period of time, on predefined dates. Channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time, beyond the time which the predefined recording would otherwise be saved. Television programming recorded based on provider-defined timers may be stored to a portion of storage medium 225 for provider-managed television programming storage.

User interface 250 may receive communications from one or more remote controls that allow a user to interact with television receiver 200. User interface 250 may receive and send received commands to control processor 210a, which may then process the commands using a control engine. In some embodiments, it may be possible to load some or all preferences to a remote control. As such, the remote control can serve as a backup storage device for user preferences. In such embodiments, the communication link with the remote control via user interface 250 is bidirectional. User interface 250 may be configured to receive commands from one or more remote controls. User interface 250 may receive commands via BLUETOOTH, NFC, an IR-implemented protocol, an RF-implemented protocol, or some other communication protocol.

Security device 260, which may be implemented as a smart card, may be used for decrypting incoming data. The decrypted data may be used by descrambling engine 265 for descrambling video and/or audio. Descrambled video and/or audio may be output by descrambling engine 265 to storage medium 225 for storage, such as in DVR database 245, and/or to decoder module 233 for output to a television or other presentation equipment via television interface 235.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

PID filters 255 may be configured to filter data packets based on PIDs. In some embodiments, PID filters 255 are created and executed by tuning management processor 210b. In other embodiments, separate hardware may be used to create and execute such PID filters. Depending on a television channel selected for recording/viewing, a PID filter may be created to filter the video and audio packets associated with the television channel, based on the PID assignments present in PMT 257. For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210b.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer systems disclosed further herein.

While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely.

Figure 3:
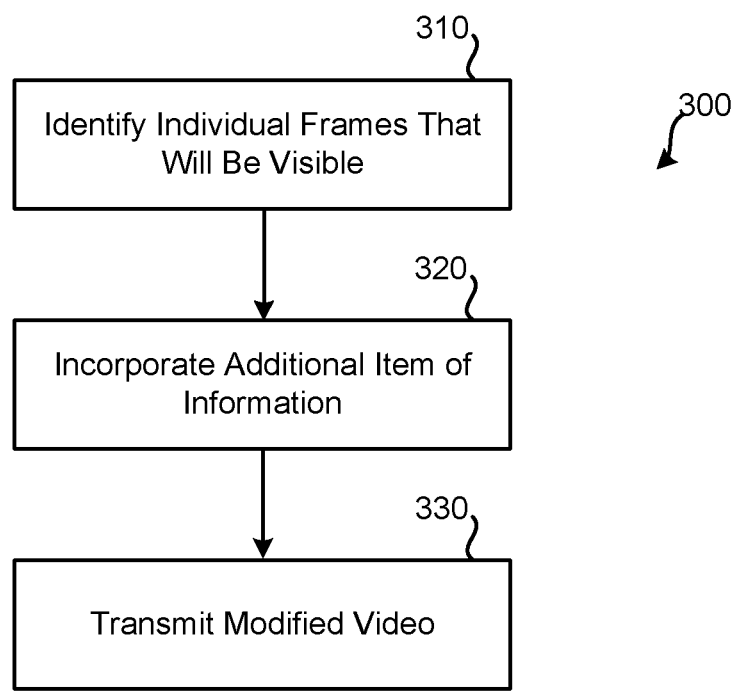
FIG. 3 shows a simplified flow diagram of a method for incorporating additional content according to embodiments of the present technology.

The systems and devices previously described may be used in performing various methods. The methods may also be represented by programming stored in memory of a computing device. FIG. 3 illustrates an embodiment of a method 300 for incorporating additional material in video content. Method 300 may be performed using any of the systems or components previously described, and in embodiments may be performed upstream of the systems previously described, such as by a content generator. Method 300 may allow a content generator to incorporate additional hidden content into video streams that will then be visible during certain playback operations. Each step of method 300 may be performed at or by a single electronic device, such as any of a variety of video editing equipment, or by multiple devices communicating with one another. Means for performing each step of method 300 may include an electronic device and/or the various components of an electronic device or distribution system, such as those detailed in relation to FIGS. 1 and 2. Method 300 may be performed using a computerized device, such as a device incorporating some or all of the components of computer system 600 of FIG. 6.

An advertiser or content generator may want to include additional content such as Easter egg-like content with general advertising or program content in order to capture viewer attention even during fast-forward operations. Generally in media content, Easter eggs refer to either hidden images, text, or content that becomes visible or accessible as a response to predetermined commands. In the present context, such commands may include a user-provided command such as fast-forward or rewind during broadcast content, and may either expose or allow to be visible additional or incorporated content that is substantially hidden during normal viewing. Accordingly, the content generator may selectively incorporate content that is substantially visible during adjusted playback including fast-forward operations, but is substantially hidden during normal video playback, which may be accomplished generally with some or all operations of method 300. Although the content generator is described below as an advertiser producing advertising content, it is to be understood that the present technology can be readily expanded to virtually any content producer including video, media, gaming, or other content producers. Similarly, although examples throughout will generally refer to the adjusted playback operation to be fast-forward operations, it is to be understood that other adjustments to playback are also encompassed including rewind, for example.

Method 300 may include identifying individual frames within a portion of video content that will be visible during an adjusted playback at operation 310. The method may include incorporating at least one additional item of information within at least one of the individual frames identified to produce modified video content at operation 320. The method may also include transmitting the modified video content for display at operation 330.

When a content generator produces content, such as an advertiser producing an advertisement spot, the content may include a number of frames over a period of time. The advertiser may recognize that individual users may opt to fast-forward over that content during broadcast or playback, and depending on the speed utilized, the video content may be unrecognizable. Understanding that such behavior regularly occurs, the advertiser may desire to provide incorporated content that can be viewed with clarity during the fast forward operation. Such content may be included in any number of ways, and may include almost limitless options for content inclusion.

Electronic devices including DVR equipment, set-top boxes, television receivers, mobile devices, and other equipment with which a user may view video content may utilize a number of mechanisms to enact fast-forward operations. In some equipment, or utilizing certain software, a fast-forward operation may include simply skipping frames displayed based on the speed at which fast-forwarding may occur. For example, if a 2× fast-forward operation is performed, what may show on the display is every other frame of video, and if an 8× fast-forward operation is performed, what may show on the display is every eighth frame of video. Other technology may include representative frames for sections of video that are displayed during fast-forward or rewind operations that are displayed for a period of time while traversing a portion of the modified video content. For example, as a user is fast-forwarding at 4× normal playback speed, a single frame or image from the video content may be displayed for a period of time while the operation is continued.

The displayed frame or image may or may not be every fourth frame of content, and may be one image representative of the context of the content being skipped by the user. This image may switch to a next representative image based on how far a user skips, and these images may or may not be equally spaced, such as every fourth frame, and may instead be spaced based on the content, and not the timing of the frames. Additionally, the amount of time that a representative image is displayed may or may not be equivalent to the number of frames traversed. For example, a representative frame may be displayed for 2, 3, 4, 10, 100, etc., times as long as normal frame display rates, and may be displayed for any period of time including a time corresponding to the time to fast-forward the particular section for which the frame is representative. For example, the representative frame may be displayed for a fraction of a second up to a second or more time depending on the fast-forward operation. These operational characteristics and mechanisms will be further addressed below.

At operation 310, the individual frames that will be displayed during a fast-forward operation as explained above may be identified by a content generator, or by a device or operator modifying the content according to the described technology. For example, a developed advertisement video may be provided to a modifier to identify which images or frames will be displayed during fast-forward or other adjusted playback operations. Based on calculation, testing, tagging, or other mechanisms, the individual frames or images within the video content that will be visible during adjusted playback, such as during fast-forward operations, may be identified for additional content incorporation. The identification may include consideration for a variety of equipment types and software types that may utilize different methodology for fast-forward as explained above.

The identification may also identify amongst the individually identified frames, subsets of frames that are displayed depending on the particular adjusted playback speed. For example, while a slower playback speed may result in the display of more of the individually identified frames, a faster playback speed may result in the display of a subset of the individual frames corresponding to the speed of the fast-forwarding operation. The subset of frames may correspond proportionally to the speed of the fast-forward operation, or in embodiments may be more or less frames than what would be proportional to the relative speed. For example, fewer frames may be displayed for longer periods of time in disclosed embodiments at higher speeds of adjusted playback. It is to be understood that any known adjusted playback speeds are contemplated and may be utilized to identify frames that will be visible, including speeds of at least about 2, 3, 4, 5, 6, 8, 16, 32, etc., times or more of normal playback.

After the individual frames that will be displayed or be visible during fast-forward have been identified, an additional item of content may be incorporated within at least one of the individual frames identified to produce modified video content at operation 320. The incorporation may include selectively placing, embedding, or otherwise incorporating information within the individual frame or frames identified. The information incorporated may include a variety of information from a logo, icon, or text information to video information or moving content.

The type of information incorporated may relate to a variety of levels of complexity with which the described technology may be performed. For example, placing a logo or short text information may be a relatively simple incorporation that may allow an advertiser, for example, to at least identify to a user to what the material being traversed via fast-forward relates. For example, at eight or sixteen times playback speed, it may be difficult for a user to perceive a particular goods or services provider based on individual frames of the content being skipped. However, if an advertiser incorporates a logo within the individual frames that will display during the fast-forward, and this logo displays on each frame displayed, the user may readily recognize who is the advertiser or producer, and whether the user wishes to receive more information such as by viewing the advertisement.

More complex items can be incorporated as well including text information that may change from frame to frame to provide a phrase, slogan, or other wording. Along with a logo or image included in the individual frames, additional content including a matrix code, selectable button, or link to additional content may be displayed. For example, a code may be included in the content that may be scanned by a user, such as with a smart phone or media device, which will provide the user with additional content including coupons, advertisements, etc. Low level video may be included that may include a number of images that may appear to provide a sequence when viewed in fast-forward similar to a flip-book. For example, an advertiser for a sandwich shop may include multiple images that when viewed in fast-forward show a person consuming a sandwich as a series of pictures, while during normal operation may not provide noticeable changes over the period of the advertisement. More complex video may also be included, and as will be understood there is virtually no limit to the type and style of content that may be incorporated into the initial video content.

The incorporation may be performed in a way that provides that the at least one item of information incorporated into the video content is substantially hidden during normal playback of the modified video content. For example, video content may proceed at a variety of frame rates including 24 or 30 frames per second (fps), for example. Accordingly, an individual frame may only appear on a display during normal operation for a small fraction of a second, such as 0.03 seconds at a 30 fps playback rate. Accordingly, if the information incorporated into the video content is only included in selected frames, the information may be of such a fleeting or transitory nature that a user may not fully perceive or even recognize the information during normal playback. However, during adjusted playback, such as fast-forward operations, if the individual frames including the information are displayed for longer periods of time, or if each frame displayed includes the incorporated information, the user may then fully perceive the additional material incorporated in the individual frames.

The incorporation may also be performed in a way to reduce distraction such as by incorporating the additional information in multiple or varying locations from frame to frame. In this way, the user may not be distracted by having a logo continually appear in the same location, which may make it more likely to be perceived by the viewer. For example, if the additional information is being incorporated on multiple frames identified as being displayed during adjusted playback such as fast-forward, the incorporation may occur by including the at least one item of information in a first position on a first identified frame, and then incorporating the at least one item of information in a second position on a second identified frame. The second identified frame may be a frame of the identified individual frames that will be visible during adjusted playback, and is sequential to the first identified frame that will be visible during adjusted playback. The second position at which the additional information is located may be the same or different from the first position, and may be chosen based on multiple factors. By sequential may be meant a number of scenarios. For example, the second frame may be a set number of frames from the first identified frame, such as 2, 4, 8, etc., or a number of frames based on a particular adjusted playback speed. Additionally, in embodiments the second frame may be the next representative frame for content following the content represented by the first identified frame.

The context of the video to which the at least one item of information is being incorporated may also be determined in disclosed embodiments. For example, whether the video content includes static shots or moving content may be considered when incorporating the video content. The at least one item of information may be incorporated based on the context of the video content, and then positioned within one or more individual frames in a location configured to reduce distraction during normal viewing of the content. For example, if the additional information were positioned directly over the face of an actor or person in the content, the content may be more likely to be perceived under normal viewing conditions because the user or viewer may be focused on that specific area. However, if the action content is occurring or being displayed on one side or portion of a display frame, which action may include motion, a person talking, or shots of a situation or actor, the additional information may be positioned in an alternative location including at an opposite location on the screen or over a background environment. When coupled with the time during which the content would be shown under normal viewing conditions, which may be only a small fraction of a second, distraction to the user may be minimized or avoided.

After the material has been incorporated to produce the modified video, the modified video may be transmitted at operation 330. The transmission may include transmission from any number of sources to any number of receivers, including transmission from a content generator, such as an advertiser, to a broadcast service provider. The transmission may also be from a service provider to one or more viewers or receivers, or simply from a particular STB or receiver to a display device to be received by a viewer. As would be understood, a variety of other configurations may be performed that are encompassed by this technology and recognizable from these non-limiting examples.

Figure 4:
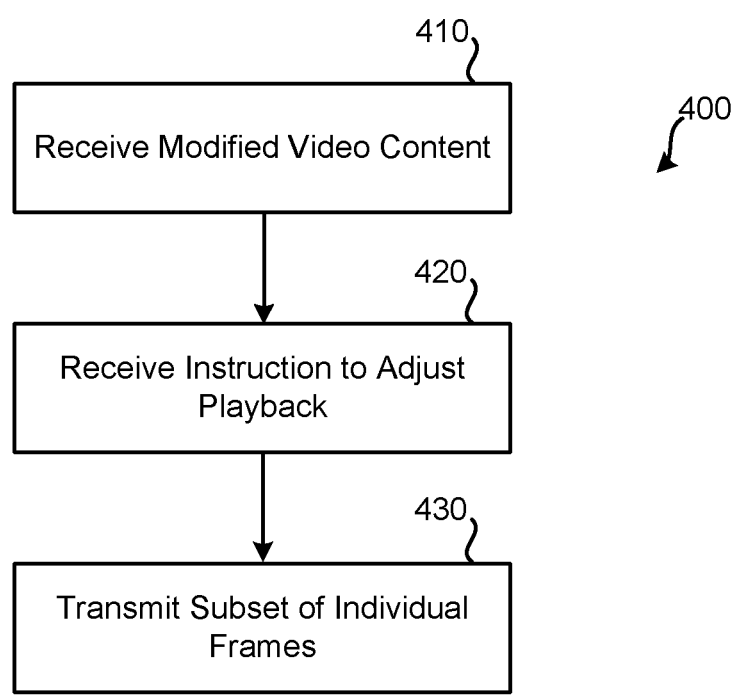
FIG. 4 shows a simplified flow diagram of a method for incorporating additional material according to embodiments of the present technology.

FIG. 4 illustrates an embodiment of a method 400 for providing additional content to a viewer of video content. Method 400 may be performed using any of the systems or components previously described. Method 400 may allow for an electronic device to provide additional content such as hidden content to a viewer in order that the viewer may perceive the hidden content more clearly. Although the content described throughout is termed hidden, the term encompasses content that may simply be more difficult to perceive by a viewer or may be transiently displayed for fractions of a second, as would be understood as explained throughout this technology. Each step of method 400 may be performed at or by a single electronic device, such as an STB, DVR, or mobile device, for example, or by multiple devices communicating with one another. Means for performing each step of method 400 include an electronic device and/or the various components of an electronic device or distribution system, such as those detailed in relation to FIGS. 1 and 2. Method 400 may be performed using a computerized device, such as a device incorporating some or all of the components of computer system 600 of FIG. 6.

The electronic device utilized in the technology may be a television receiver or set-top box as previously described, and may include at least one input component configured to receive audiovisual content that may include video content. The electronic device may also include at least one output component communicatively coupled with at least one display device, such as previously described. The electronic device may include one or more processors as well as memory coupled with and readable by the one or more processors and having stored therein processor readable instructions. When executed by the processor, the instructions may cause the processor to receive modified video content at operation 410. The video content may include modified video content that includes a subset of frames having incorporated additional content such as previously described. In disclosed embodiments, the STB may be programmed or configured to produce the modified content, such as by any of the previously disclosed methods, for example.

The electronic device may be performing a normal playback function of the received modified content, and may receive an instruction to adjust playback at operation 420, such as with an instruction to fast-forward at a particular rate as previously described. In disclosed embodiments the additional information contained in the modified content may be partially or substantially hidden during normal playback of the modified video content, while the information may become apparent during fast-forward operations as described above. In response, at operation 430, the electronic device may be caused to transmit via the at least one output the subset of individual frames having the incorporated additional content.

The electronic device may operate in disclosed embodiments in a more passive fashion in which it transmits the information alone. In disclosed embodiments the receiver may have previously received modified content specifically configured based on the type of fast-forward performed by the electronic device. For example, if the electronic device performs fast-forward operations by simply skipping the number of frames corresponding to the level of playback or fast-forward, the modified content delivered may include the additional information in a way that allows the information to be perceived by such a system. Additionally, if the electronic device is configured to display a particular frame representative of content for a period of time that is being skipped, the modified content may be so configured as well, such as in the ways previously described. In such an example, the electronic device may be configured to provide at least one or more of the subset of individual frames to be displayed for a period of time while traversing a portion of the modified video content. In disclosed embodiments the transmission may include providing for display a selection of the subset of the individual frames corresponding to the speed of the fast-forwarding operation. In such embodiments, fewer frames may be displayed at faster rates of fast-forward, and more frames may be displayed at slower rates of fast-forward, for example. As previously explained, the fast-forward operations may be performed at any rate or speed as may be available on the particular electronic device used in the performance of the technology.

The transmitted subset of individual frames may display an icon, graphic, or any of the material previously discussed, and the material may move position with the frame space from one of the individual frames displayed to the next. In so doing, distraction to the user may be minimized or reduced. This is further explained with reference to FIG. 5 below.

Figure 5:
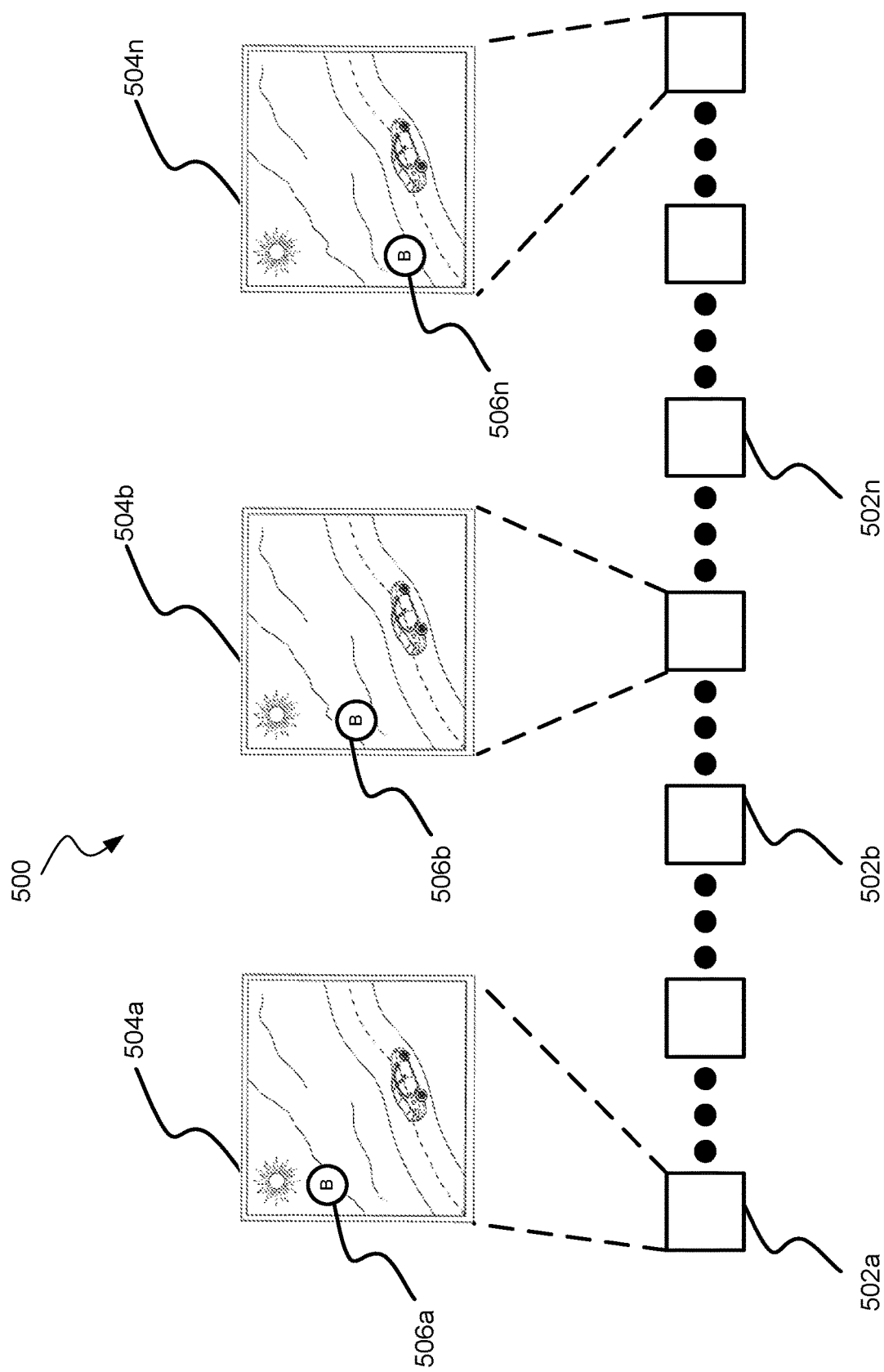
FIG. 5 shows an exemplary set of video frames that include a subset of frames including additional content according to embodiments of the present technology.

The way in which the additional information is displayed to a user may take any or a combination of a number of forms. FIG. 5 illustrates an exemplary set of individual frames 500 within a portion of video content that includes additional material that will be visible during adjusted playback, such as a fast-forward or rewind function. The video content may include a number of frames 502 that may include frames with additional content 502*a* incorporated in the frame as well as other frames 502*b*, 502*n* that may or may not include additionally incorporated content. The video content frames 502 may include a subset of frames 504, displayed in detail, in which additional information has been incorporated. The additional content may take any of the forms previously described.

Frames 504 may be identified as individual frames that may be displayed during adjusted playback functions such as fast-forward. The frames may be identified based on the device that will be delivering the content in order to ensure that the frames are displayed during adjusted playback. Frames 504 may be proportionately separated, such as a specific number of frames in between them, or the frames 504 may be identified as representative frames of context for a subset of the video frames 502. The frames 504 may then be any distance in position from one another based on predetermined representations for the included content. Accordingly, although illustrated in what appears to be an even sequence, this may not be the case as any number of frames 502 may be represented by each frame 504, and these numbers may not be consistent frame to frame.

On each frame of the subset of frames 504 may be included additional information 506 that may take any of the forms previously described. As illustrated, for one non-limiting example, a logo or graphic 506 may be displayed within frame 504. The position may be determined based on the context of the video content as previously described in order to reduce or minimize distraction to the viewer during normal playback operations. Additionally, in embodiments, graphic 506 may be positioned in multiple locations across the identified frames in order to further reduce user distraction. With this technology, advertisers or other content generators may be capable of maintaining advertisement delivery even during adjusted playback by a user, while additionally limiting distractions to users viewing the content at normal playback speeds.

Figure 6:
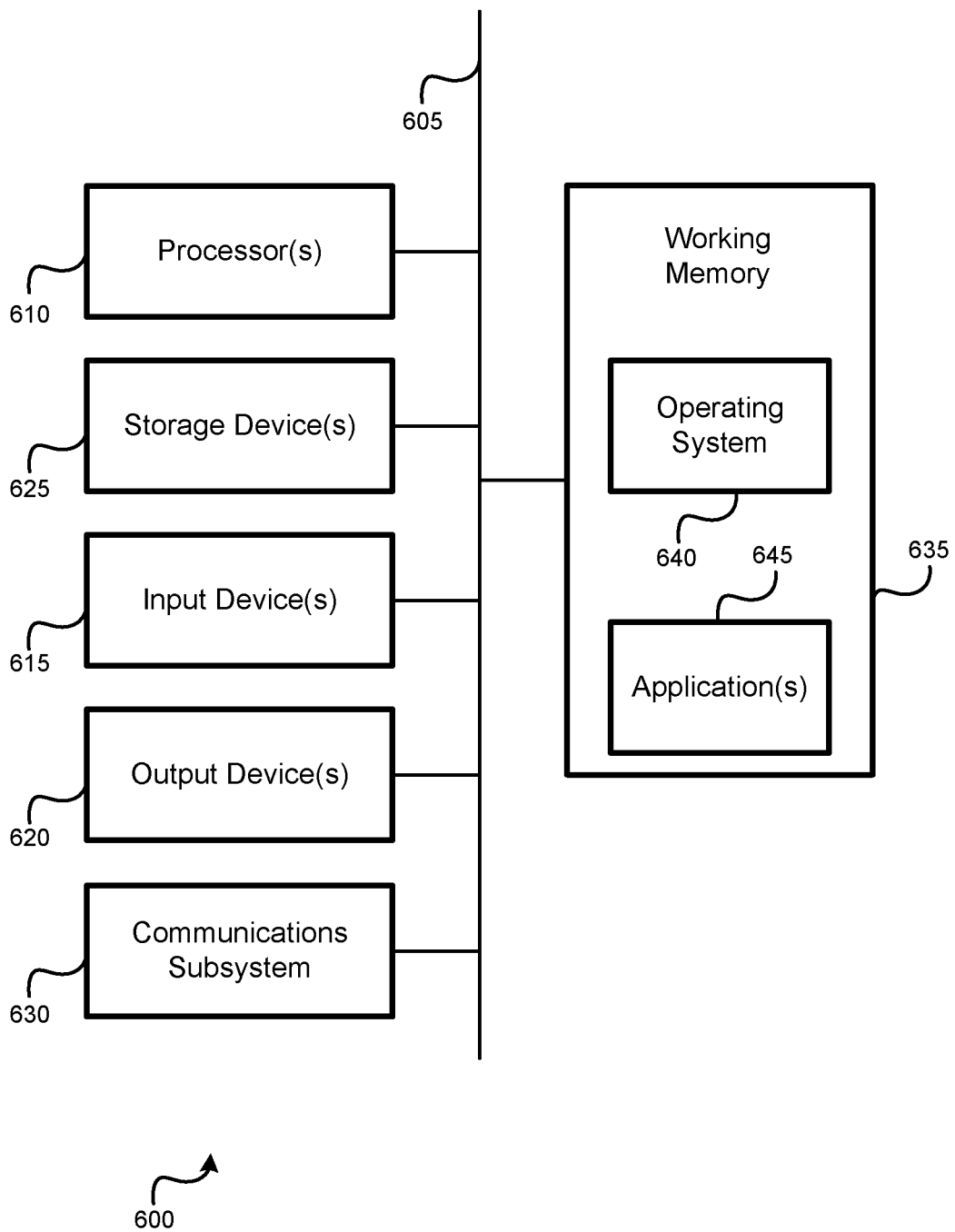
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 3 and 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed:

1. An electronic device to provide modified video content for presentation during adjusted playback of video content, the electronic device comprising:
   at least one input component configured to receive audiovisual content
   at least one output component configured to transmit audiovisual content;
   one or more processors; and
   memory communicatively coupled with and readable by the one or more processors and having stored therein processor-readable instructions, which, when executed by the one or more processors, cause the one or more processors to perform:
   receiving a command to adjust playback of the video content and identifying one or more individual frames that will be visible during adjusted playback of the video content, wherein the identifying is a function of a speed of traversing a set of individual frames during the adjusted playback of the video content;
   responsive to the command being a first fast-forward operation to traverse the set of individual frames at a first predetermined speed, selecting a representative frame from the set of individual frames to be displayed as representative of the set of individual frames for an entire time while the first fast-forwarding operation is performed, where the representative frame is modified by incorporating at least one item of information from a set of one or more items of information to be rendered within the representative frame;
   responsive to the command being a second fast-forward operation to traverse the set of individual frames at a second predetermined speed, selecting a subset of frames from the set of individual frames and the second predetermined speed for display while the second fast-forward operation is performed, where:
   the subset of frames is modified by incorporating the at least one item of information to be rendered in one or more locations within at least some of the subset of frames, and
   the second predetermined speed is greater than the first predetermined speed; and
   causing transmission of the modified representative frame or the modified subset of frames via the at least one output component.

2. The electronic device as recited in claim 1, where one or both of the modifying the representative frame and the modifying the subset of frames is performed before the command is received.

3. The electronic device as recited in claim 1, where one or both of the modifying the representative frame and the modifying the subset of frames is performed after the command is received.

4. The electronic device as recited in claim 1, where the at least one item of information is substantially hidden during non-adjusted playback of the modified content.

5. The electronic device as recited in claim 1, where the at least one item of information comprises at least one of an icon, a logo, or text.

6. The electronic device as recited in claim 1, wherein the incorporating the at least one item of information from the set of one or more items of information within the representative frame of the set of individual frames is based at least in part on determining a context of the video content to which at least one item of information is to be incorporated, wherein the determining comprises evaluating whether the representative frame is part of a video segment displaying static content or moving content.

7. The electronic device as recited in claim 1, where incorporating the at least one item of information within the at least one of the individual frames identified comprises incorporating the at least one item of information in a first position on a first identified frame, and incorporating the at least one item of information in a second position on a second identified frame.

8. An method to provide modified video content for presentation during adjusted playback of video content by:
   receiving a command to adjust playback of the video content and identifying one or more individual frames that will be visible during adjusted playback of the video content, wherein the identifying is a function of a speed of traversing a set of individual frames during the adjusted playback of the video content;
   responsive to the command being a first fast-forward operation to traverse the set of individual frames at a first predetermined speed, selecting a representative frame from the set of individual frames to be displayed as representative of the set of individual frames for an entire time while the first fast-forwarding operation is performed, where the representative frame is modified by incorporating at least one item of information from a set of one or more items of information to be rendered within the representative frame;
   responsive to the command being a second fast-forward operation to traverse the set of individual frames at a second predetermined speed, selecting a subset of frames from the set of individual frames and the second predetermined speed for display while the second fast-forward operation is performed, where:
   the subset of frames is modified by incorporating the at least one item of information to be rendered in one or more locations within at least some of the subset of frames, and the second predetermined speed is greater than the first predetermined speed; and causing transmission of the modified representative frame or the modified subset of frames via at least one output component.

9. The method as recited in claim 8, where one or both of the modifying the representative frame and the modifying the subset of frames is performed before the command is received.

10. The method as recited in claim 8, where one or both of the modifying the representative frame and the modifying the subset of frames is performed after the command is received.

11. The method as recited in claim 8, where the at least one item of information is substantially hidden during non-adjusted playback of the modified content.

12. The method as recited in claim 8, where the at least one item of information comprises at least one of an icon, a logo, or text.

13. The method as recited in claim 8, wherein the incorporating the at least one item of information from the set of one or more items of information within the representative frame of the set of individual frames is based at least in part on determining a context of the video content to which at least one item of information is to be incorporated, wherein the determining comprises evaluating whether the representative frame is part of a video segment displaying static content or moving content.

14. The method of claim 8, where incorporating the at least one item of information within the at least one of the individual frames identified comprises incorporating the at least one item of information in a first position on a first identified frame, and incorporating the at least one item of information in a second position on a second identified frame.

15. One or more non-transitory, processor-readable media comprising instructions which, when executed by one or more processing devices, cause the one or more processing devices to perform:

receiving a command to adjust playback of video content and identifying one or more individual frames that will be visible during adjusted playback of the video content, wherein the identifying is a function of a speed of traversing a set of individual frames during the adjusted playback of the video content;

responsive to the command being a first fast-forward operation to traverse the set of individual frames at a first predetermined speed, selecting a representative frame from the set of individual frames to be displayed as representative of the set of individual frames for an entire time while the first fast-forwarding operation is performed, where the representative frame is modified by incorporating at least one item of information from a set of one or more items of information to be rendered within the representative frame;

responsive to the command being a second fast-forward operation to traverse the set of individual frames at a second predetermined speed, selecting a subset of frames from the set of individual frames and the second predetermined speed for display while the second fast-forward operation is performed, where:

the subset of frames is modified by incorporating the at least one item of information to be rendered in one or more locations within at least some of the subset of frames, and the second predetermined speed is greater than the first predetermined speed; and causing transmission of the modified representative frame or the modified subset of frames via at least one output component.

16. The one or more non-transitory, processor-readable media as recited in claim 15, where one or both of the modifying the representative frame and the modifying the subset of frames is performed before the command is received.

17. The one or more non-transitory, processor-readable media as recited in claim 15, where one or both of the modifying the representative frame and the modifying the subset of frames is performed after the command is received.

18. The one or more non-transitory, processor-readable media as recited in claim 15, where the at least one item of information is substantially hidden during non-adjusted playback of the modified content.

19. The one or more non-transitory, processor-readable media as recited in claim 15, where the at least one item of information comprises at least one of an icon, a logo, or text.

20. The one or more non-transitory, processor-readable media as recited in claim 15, wherein the incorporating the at least one item of information from the set of one or more items of information within the representative frame of the set of individual frames is based at least in part on determining a context of the video content to which at least one item of information is to be incorporated, wherein the determining comprises evaluating whether the representative frame is part of a video segment displaying static content or moving content.

* * * * *